Dec. 27, 1966         E. EICHLER         3,294,613
PROCESS FOR COATING THERMOPLASTIC MATERIAL ON CARRIER WEBS
Filed Nov. 15, 1960
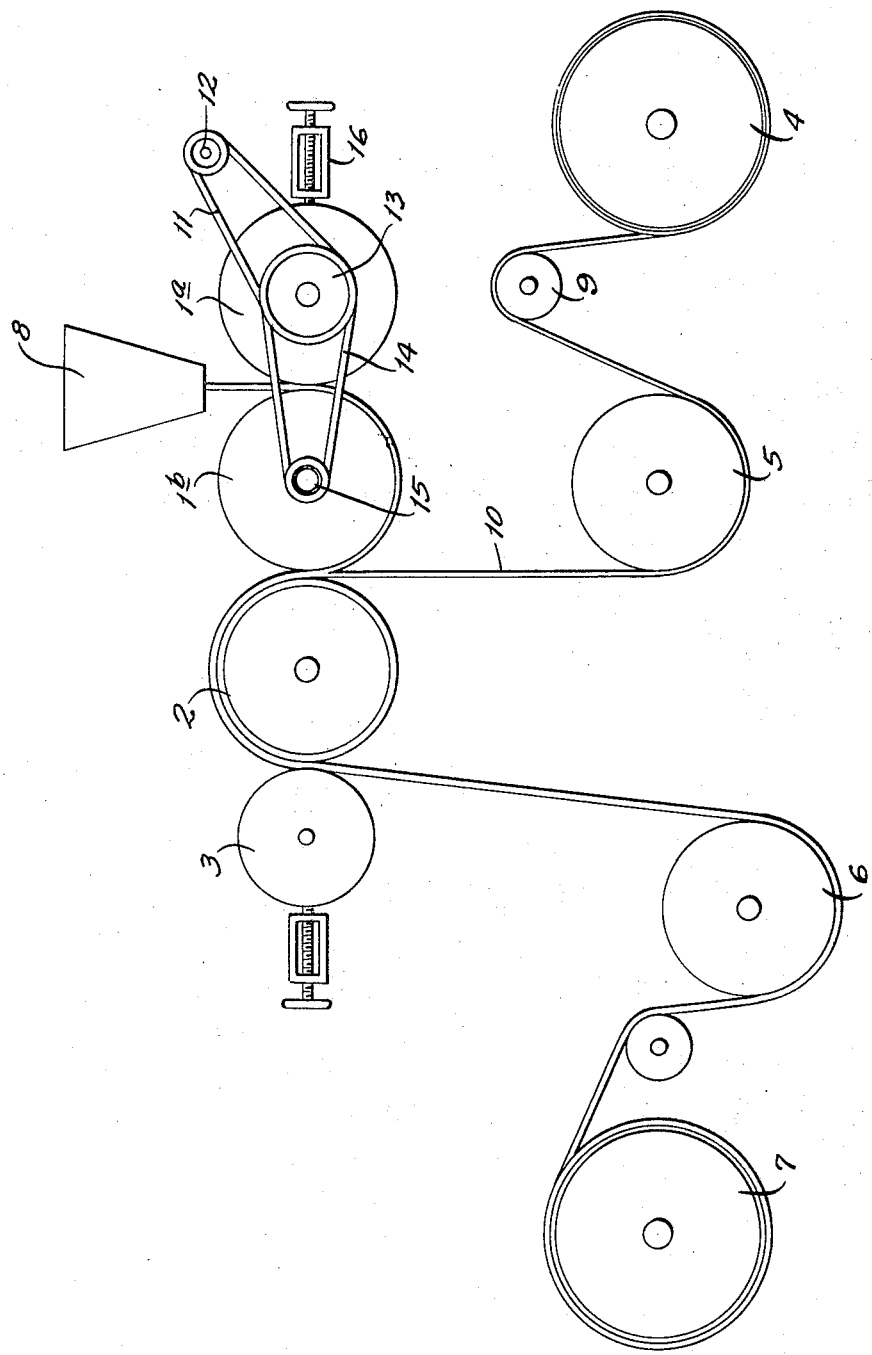
INVENTOR:
Erich Eichler,
BY Bair Freeman & Molinare
ATTORNEYS.

3,294,613
PROCESS FOR COATING THERMOPLASTIC
MATERIAL ON CARRIER WEBS
Erich Eichler, Buderich, near Dusseldorf, Germany, assignor to Hans J. Zimmer, Frankfurt am Main, Germany
Filed Nov. 15, 1960, Ser. No. 69,377
1 Claim. (Cl. 156—242)

This invention relates to process for coating thermoplastic material on carrier webs. There are many purposes for which it is desirable to coat or laminate the surface of webs of paper, textiles, felt and the like with thermoplastic material. This coated or laminated material is, according to the nature of the basic material and the plastic coating, used for the manufacture of protective covers, screens, upholstery and wall coverings, as well as for other covering and packing purposes.

If plastic coatings in thin layers are to cover the surface of webs, the so-called extrusion process can be applied, i.e., thermoplastic material is extruded by pressure through a nozzle with a slot, for instance a full-width slotted nozzle. The full-plastic hot bands are then bonded to a carrier web under pressure.

Another known process spreads a paste-like uncured plastic substance on the carrier web by means of a spreading device (doctor) and cures the plastic coated material by generation of heat.

A further method is the calendering of a plastic foil which is bonded under pressure to the web in the last stage of the calender.

If very thin layers are to be applied, as especially chosen for the manufacture of packing materials or protective covers, watery dispersions can also be brought onto the carrier webs and then dried. There has also been proposed a process for producing coating films by extruders or calenders and for adhering these preformed films to carrier webs by such means that the film layer is either exposed to heat or provided with an adhesive layer and then bonded to the carrier web.

All of these processes can, however, only be employed in a limited range. They entail considerable investments in equipment and the processing line is longer than seems advisable from an economic point of view.

The present invention has for its principal object a process for the production of film layers which can be very thin and which can be applied in a short processing line to carrier webs.

Another object is to provide a process for coating thermoplastic material on carrier webs in which the thermoplastic material is spread in a uniform film on the surface of a heated roll and is transferred directly from the heated roll to a carrier web.

According to a feature of the invention the plastic material is fed into the nip of two heated rolls traveling at different speeds and forms in a film on the roll traveling at the higher speed. The web traveling at the same speed as the last named roll is pressed against it and picks up the film from it.

The process of the invention for the production of coatings made by adhesion of a hot thermoplastic film to a carrier web is characterized by the following: The plastic material which is to be applied to the carrier web is fed into the nip of two heated rolls, heated up by these rolls and due to their variable rotating speed pressed through the gap therebetween. The film which is formed in this gap between the rolls and which adheres to the roll rotating at a higher speed is transferred to the carrier web approaching with a speed corresponding to that of the film carrier roll. The thus produced laminated or coated material is then taken off and is passed over a cooling roll or a cooling section.

In one of the types of process of the invention, the plastic material which is to be applied to the carrier web is fed into the nip of the two rolls in the shape of pellets or powder.

All kinds of thermoplastic materials can be applied as base synthetic substance, i.e., polyvinyl chloride, hard or soft, high or low pressure polyethylene, polystyrol, polyamides of both types, polycarbonate and cellulose acetate.

Preferably, the roll rotating at a higher speed, i.e., the roll carrying the film, is maintained at a temperature higher by 1 to 20° C. than that on the roll rotating at a lower speed.

The ratio of the circumferential speeds of the two rolls can fluctuate within a rather large range. But it is essential that the roll carrying the film has a higher circumferential speed than that of the other. Tests have proved that it is advisable to run the roll carrying the film at a circumferential speed which is at least ten times higher than that of the other roll. Results remained satisfactory even if the difference in the circumferential speeds of the two rolls was very high. The ratio can be set to 1:50 and even higher.

Due to the heat on the rolls the thermoplastic material which is fed into the two rolls conglomerates to a soft molten mass but which, nevertheless, is not sufficiently liquified to flow between the rolls.

This mass lies in the shape of a wedge on the roll rotating at a lower speed and is drawn continuously into the gap between the rolls at the same rate at which plastic material is fed into the nip of the rolls and, due to pressure, passes as a film layer to the higher speed rotating roll. Contrary to conditions resulting with the calender process, no rotating bank in or above the gap between the rolls is formed. Consequently no countercurrent turbulence occurs as with the known processes which operate with the same or almost the same circumferential speed of the rolls—a procedure which may lead to the reflux of plastic particles of various heat grades.

It is known that the thermoplastic material which is to be transformed can be fed into the nip of two rolls in calenders, rolling mills and similar devices, and that a film of required thickness is achieved by adjustment of the spacing between the rolls. But this method entails a considerable amount of work as in or before the gap the pressure and the reflux tendency of the material which is trying to pass the gap is very great. Pressure and reflux rise the thinner the film is to be. Pressure can rise to such a height that the power of the rolls is exceeded. It is possible to liquefy the thermoplastic material so far by raising the temperature that the resistance power in the gap between the rolls remains in acceptable limits, nevertheless the mechanical strain on the devices for film production is very great. This strain is minimized if the process of the present invention is applied according to which the circumferential speed of the roll carrying the film is higher than was heretofore usual with calenders and rolling mills. At the same time the temperature of the plastic material can be kept relatively low.

Operating is done in the plastic temperature zone and it is not necessary to go into the melt zone. The plastic zone, for instance for polyvinyl chloride, extends, depending upon the grade of polymerization and the content of softening agent, from about 60–70° C. to 140° C., for polyethylene it is narrower and extends from 80° C. to 120° C.

The use of the present invention has shown that the adhesion of the film layer to the carrier roll increases the higher the working temperature is and the thinner the layer which is to be produced. It is astonishing that a fairly high heating of the plastic material does not hinder the taking off from the carrier roll and the bonding to the carrier web, even in the case of a very thin film layer.

The process of the invention permits thick and thin plastic coatings. It is of great importance to note that even layers with a thickness of 10μ and lower can be produced. Of polystyrene, cellulose acetate, polyethylene and softened polyvinyl chloride a thickness of layers lying between 5/6 and $^{25}\!/_{30}\mu$ can be obtained according to the operating temperatures. Such thin layers cannot be achieved by processes as heretofore known.

Further advantages of the invention are represented by the fact that the heating effect of the two rolls rotating at highly variable circumferential speed causes the thermoplastic material to form into a mass in the shape of a wedge with uniform temperature portions which are taken up by the fast rotating roll. A homogeneous film layer of very constant temperature and thickness is thereby continuously produced, this being a stipulation for a high-quality coating.

It must be stressed with regard to the thermoplastic material that in the melt gap no revolving of the thermoplastic material occurs due to the effect of the slow rotating roll and that thereby in the melt gap most intensive heating of the material is achieved practically under exclusion of air which otherwise could cause oxidation of highly sensitive synthetic material.

One form of apparatus according to the invention is shown in the accompanying drawing in which the single figure is a diagrammatic view of one form of apparatus for carrying out the invention. The apparatus as shown comprises heated steel rolls 1a and 1b into the nip of which thermoplastic material is fed from container 8. Roll 1b is driven at a higher circumferential speed than roll 1a. As shown the roll 1a is driven through a belt or chain 11 from a driving pulley 12. The belt 11 engages one section of a large pulley or sprocket 13 and a belt 14 engages a second section of the large pulley 13 and a small pulley 15 on the roll 1b to drive it at a higher speed than roll 1a.

Both rolls are heated electrically or by steam to such an extent that the thermoplastic material will be melted to a soft mass and will pass through the gap between the rolls to form a film on roll 1b rotating at the higher circumferential speed. The spacing of the rolls can be adjusted to adjust the film thickness by an adjusting screw device 16 connected to roll 1b.

A carrier web 10 comes from carrier web roll 4 over guide roll 9 and eventually over roll 5 which can act as preheater. From roll 9 the web 10 passes into the gap between a rubber covered roll 2 and the film carrier roll 1b which are turning at the same peripheral speed. The carrier web takes the film off of roll 1b. The coated carrier web can then eventually pass imprinting roll 3 and if necessary a cooling roll 6. The coated material is then rolled up on storage roll 7.

While one embodiment of the invention has been shown and described herein, it will be understood that it is illustrative only and not to be taken as a definition of the scope of the invention, reference being had for this purpose to the appended claim.

What is claimed is:

A process for coating thermoplastic material on a carrier web which comprises, feeding dry unmolten particles of thermoplastic material into the nip of a pair of rolls, heating the rolls to heat the thermoplastic material to a soft plastic state at a temperature below the melting point of the material, turning one of the rolls to produce a peripheral speed at least ten times faster than the peripheral speed of the other roll to draw a film of the hermoplastic material between the rolls onto the surface of said one of the rolls, heating the roll turning at the higher speed to a higher temperature than the roll turning at lower speed, moving a carrier web to be coated at the same speed as the surface speed of said one of the rolls, and pressing the carrier web against the film on said one of the rolls to transfer the film to the carrier web.

References Cited by the Examiner

UNITED STATES PATENTS

| Re. 2,207 | 3/1866 | Hayward et al. | 156—231 |
|---|---|---|---|
| 68,365 | 9/1867 | Hull | 156—501 X |
| 2,054,115 | 9/1936 | Abrams. | |
| 2,070,600 | 2/1937 | Jenett | 156—231 |
| 2,222,956 | 11/1940 | Seaton. | |
| 2,236,766 | 4/1941 | Schneider | 154—97.5 |
| 2,716,074 | 8/1955 | Mick. | |
| 2,768,905 | 10/1956 | Massey. | |

FOREIGN PATENTS

| 896,673 | 5/1944 | France. |
|---|---|---|

OTHER REFERENCES

Litzler, C. A.: "The Surface Coating and Impregnation of Fabric," Rubber Age, July 1952, p. 501 et seq.

EARL M. BERGERT, *Primary Examiner.*

RICHARD D. NEVIUS, *Examiner.*

K. G. WHEELES, M. E. ROGERS, V. A. MALLARE, T. R. SAVOIE, *Assistant Examiners.*